United States Patent [19]

Meyer et al.

[11] 4,006,673
[45] Feb. 8, 1977

[54] ADJUSTABLE AIR OUTLET NOZZLE FOR AUTOMOBILE HEATING AND VENTING SYSTEMS

[75] Inventors: Ernst Meyer; Karl Burghoff, both of Oberursel, Taunus, Germany

[73] Assignee: Max Kammerer GmbH, Oberursel, Taunus, Germany

[22] Filed: Mar. 21, 1975

[21] Appl. No.: 560,940

[30] Foreign Application Priority Data

Mar. 21, 1974 Germany .......................... 2413628

[52] U.S. Cl. .............................. 98/40 A; 98/41 R; 98/2; 251/352
[51] Int. Cl.² ................ F24F 13/06; F24F 13/10
[58] Field of Search .............. 98/2, 40 A, 41 R; 251/352, 248, 250.5; 137/601; 239/587, 569

[56] References Cited

UNITED STATES PATENTS

| | | | |
|---|---|---|---|
| 2,672,806 | 3/1954 | Vehige | 98/41 R |
| 2,830,523 | 4/1958 | Vehige | 251/352 |
| 2,837,991 | 6/1958 | DeRoo | 98/41 R |
| 3,010,381 | 11/1961 | Glass | 98/41 R |
| 3,136,525 | 6/1964 | Creasser | 251/250.5 |
| 3,186,329 | 6/1965 | Kennedy | 98/40 A |
| 3,366,363 | 1/1968 | Hogan et al. | 98/40 A |
| 3,420,448 | 1/1969 | Snow | 98/41 R |
| 3,802,328 | 4/1974 | Kakizaki | 98/40 A |
| 3,835,759 | 9/1974 | Lloyd | 98/40 A |
| 3,898,921 | 8/1975 | Trube et al. | 98/40 A |

Primary Examiner—John J. Camby
Assistant Examiner—Henry C. Yuen
Attorney, Agent, or Firm—Joseph A. Geiger

[57] ABSTRACT

An adjustable air outlet nozzle for automobile heating and venting systems in which a spherical hollow nozzle is connected to a surrounding housing lodgement by means of an intermediate gimbal ring and includes a double-clappet valve which is operable by means of a wing knob, through a bevel gear drive. The nozzle shell has an inner wall with an abutment shoulder for the valve clappets and a progressively widening gap for sensitive throttling of the air flow.

10 Claims, 3 Drawing Figures

ADJUSTABLE AIR OUTLET NOZZLE FOR AUTOMOBILE HEATING AND VENTING SYSTEMS

BACKGROUND OF THE INVENTION

1. Field of the Invention

The present invention relates to air ducts for automobile heating and venting, or air conditioning systems, and in particular to adjustable air outlet nozzles for such systems which are closable by means of a built-in clappet valve.

2. Description of the Prior Art

Heating and venting or air conditioning systems in automobiles are normally provided with several air outlets into the interior of the automobile, the air outlet ports being preferably equipped with an adjustable air nozzle whose setting controls the volume and direction of the air flowing into the interior of the vehicle.

A known adjustable air nozzle of this type consists essentially of a nozzle shell of spherically curved exterior contour received inside a matching lodgement of a connector housing, the nozzle shell engaging the lodgement through the intermediate of a surrounding sliding ring of textile material, preferably felt, so that the shell is universally pivotable inside the housing. This known nozzle, which is disclosed in U.S. Pat. No. 3,420,448, further includes a clappet valve arranged inside the nozzle shell, which valve is a so-called double-clappet valve, adjustable by means of a wing knob and bevel gear drive. The latter includes a driving gear on the longitudinal axis of the air nozzle and a driven gear attached to each of the two valve clappets, respectively, the latter being arranged to pivot in opposite directions on a common shaft.

This prior art device has the shortcoming that the felt ring on the outside of the nozzle shell often becomes prematurely worn as a result of frequent adjustments of the air nozzle, so that the friction between the nozzle shell and the connector housing diminishes to a point where it can no longer transmit the force which is exerted on the wing knob during adjustment of the double-clappet valve. The result of this situation is that an attempted adjustment rotation of the wing knob causes the nozzle shell to rotate inside its housing, rather than adjust the position of the nozzle valve. It then becomes necessary to use both hands, or other suitable implements, for the adjustment of the volume of air flowing through the nozzle.

An additional shortcoming of this prior art device is the fact that its valve is not suitable for a sensitive adjustment of the air flow, as even a small rotation of the adjustment mechanism results in a large change in the valve aperture, thus making it difficult to accurately adjust a desired air flow.

SUMMARY OF THE INVENTION

A primary objective of the present invention is the elimination of the above-mentioned shortcomings in an improved air outlet nozzle of the earlier-mentioned type, where the double-clappet clappet valve is adapted for sensitive air flow adjustments and the nozzle shell which carries this valve and the adjustment mechanism is mechanically connected to the outer housing by means of a gimbal ring which gives the nozzle shell universal pivoting capability.

The connection of the nozzle shell to its surrounding housing by means of a gimbal ring, with two defined pivot axes, oriented at right angles to each other, assures that any adjustment forces created by the operation of the valve adjustment mechanism are directly transmitted to the housing, via one or both of the gimbal pivots, so that the risk of inadvertant rotation of the nozzle shell during adjustment is positively eliminated, without an impairment to the universal adjustability of the orientation of the nozzle shell. This makes it possible to adjust the friction between the nozzle shell and the connector housing, i.e. the pressure on the felt ring, to a lower level which is just adequate for maintaining the nozzle shell in a given orientation, but which greatly reduces the overall friction and the resulting wear. This frictional engagement may, of course, be provided by a variety of means, such as bearing friction in the pivots of the gimbal ring, special friction rings or sealing gaskets between the shell and the housing, friction buttons, or some other suitable friction means.

For the purpose of simplification of assembly, the nozzle shell and/or the connector housing are of split design, with the separation plane between the two parts passing through the bores or the gimbal ring pivots, the latter having preferably integral inner and outer bearing pins spaced apart by angles of 90°. The resulting air nozzle is extremely simple to manufacture, the split constituent parts being injection-moldable from plastic material and preferably assembled by ultrasonic welding, following the mounting of the gimbal ring and double-clappet valve. The bearing pins of the gimbal ring may be seated directly in the corresponding bores, or they may be received inside suitable bushings. The necessary seal between the nozzle shell and the spherical lodgement of the stationary connector housing is preferably obtained through suitable sealing rings which are associated with the gimbal ring, on the inner and outer sides of the latter, the gimbal ring having a cross-sectional profile in the shape of an axially oriented "I".

In a particularly advantageous embodiment of the invention, the pivot axis for the double-clappet valve is arranged, like in the known prior art design, in the vicinity of the center of the nozzle shell, and the cooperating inner wall of the nozzle shell on the side of the valve clappets is provided with an abutment shoulder for the fully extended closed clappets, with an outwardly tapering air gap defined between the outer rim of the clappets and the inner wall of the nozzle shell, for a very sensitive, throttle-type adjustment of the valve opening over a wide range of clappet motion. Compared to the earlier-mentioned known prior art nozzle design, in which the throttling range of the clappets covers an angle of approximately 2°, the proposed preferred embodiment of the invention features a throttling range of up to 40°, as a result of said outwardly opening taper between the inner wall of the nozzle shell and the path of the outer rim of the valve clappets.

The proposed air nozzle is also conveniently adaptable for a complete, air-tight closing of the clappet valve, which, when the clappets are fully extended against the earlier-mentioned abutment shoulder, engage the latter with compressible gaskets arranged on the clappet rims. These gaskets may be of felt, rubber, or some other suitable material. Alternatively, the abutment shoulder may carry a gasket, or be part of a flexible seal.

BRIEF DESCRIPTION OF THE DRAWINGS

Further special features and advantages of the invention will become apparent from the description following below, when taken together with the accompanying drawing which illustrates, by way of example, several embodiments of the invention, represented in the various figures as follows.

DESCRIPTION OF THE PREFERRED EMBODIMENTS

Figure 1:
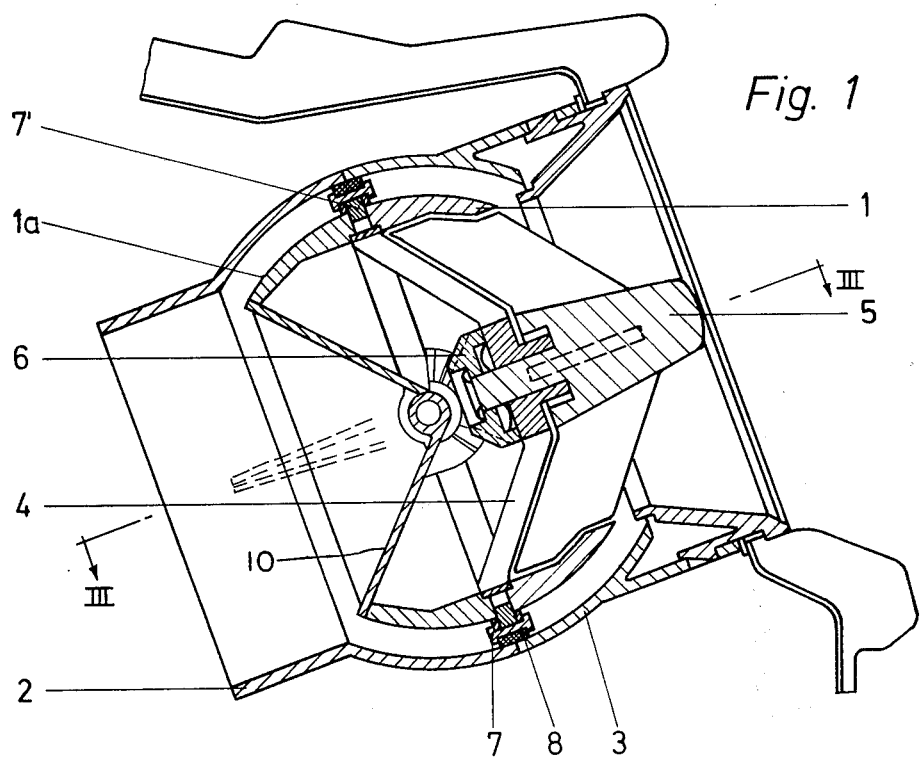
FIG. 1 shows in a longitudinal cross section an adjustable air outlet nozzle embodying the invention.
Figure 3:
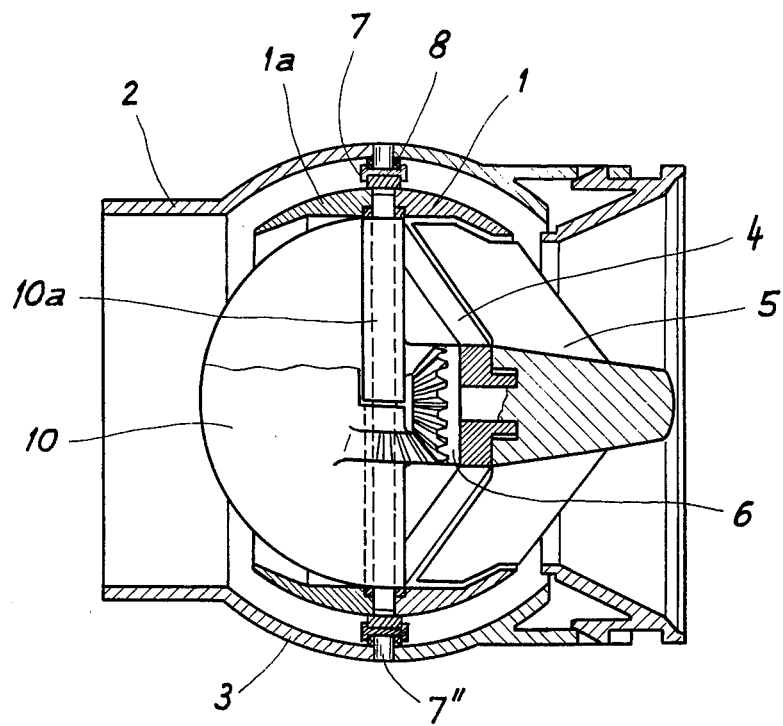
FIG. 3 is a cross section of the nozzle of FIG. 1 taken along line III—III thereof.

In FIGS. 1 and 3 of the drawing is shown a preferred embodiment of an adjustable air outlet nozzle for automobile heating and venting or air conditioning systems, in which a nozzle shell 1 is received inside a stationary connector housing 2 which concentrically surrounds the spherical outer surface 1a of the nozzle shell with a spherical lodgement 3 in the mid-portion of the connector housing 2, so as to define a uniform gap between it and the surface 1a. The latter itself may be mounted in the dashboard of an automobile, or in any other suitable place on the inside of an automobile. The nozzle shell 1 is sealed against the lodgement 3 of housing 2, while being universally pivotable with respect to the latter, as will be described further below.

The hollow nozzle shell 1 of FIGS. 1 and 3 carries in its cavity a cross support 4 which is recessed outwardly, i.e. toward the downstream exit side of the nozzle, carrying in its center a wing knob 5 which is rotatably journalled on the cross support, about an axis that coincides with the longitudinal center axis of the air nozzle. The wing knob, in turn, is connected to a bevel gear 6 which is arranged on the inner side of the cross support and which engages cooperating bevel gears of a known double-clappet valve.

The connection between the nozzle shell 1 and the connector housing 2 is provided by a gimbal ring 7 of I-shaped cross-sectional profile, the ring 7 having two pairs of aligned radially inwardly or outwardly extending pivot pins, of which the inner pins 7' are shown in FIG. 1 and the outer pins 7'' are shown in FIG. 3. The outer pivot pins are spaced at 90° angles from the inner pivot pins and engage matching bores of the lodgement 3, just as the inner pivot pins 7' engage matching bores of the nozzle shell 1.

The nozzle shell 1 is preferably of a split design, the separation plane passing through the center of the sphere which is defined by its outer surface 1a and coinciding with the plane which is defined by the four pivots of the gimbal ring. Assembly of the nozzle shell is preferably performed in an ultrasonic welding operation, after the gimbal ring has been placed inside the lodgement 3 of the connector housing 2. This split design greatly facilitates the mounting of the central cross support 4 between the nozzle shell halves, as well as the assembly of the pivot connection between the nozzle shell 1 and the pivot pins 7' of the gimbal ring 7, thanks to the fact that the separation plane also conveniently halves the bores which receive the pins 7'.

The connector housing 2 may likewise be split either longitudinally, or preferably in the transverse center plane of the gimbal ring pivots, the halves being ultrasonically welded together, following assembly of the interior parts. The gimbal ring 7 preferably carries inner and outer gaskets, such as felt rings 8, which are retained by the flange portions of its I-shaped profile. These felt rings 8 provide a convenient seal between the gimbal ring and the lodgement 3 on the one hand, and between the gimbal ring and the nozzle shell 1 on the other hand. They also provide just enough frictional resistance between these parts, so that the air nozzle is maintained in any desired orientation, in spite of possible vibrations that would tend to re-adjust the air nozzle. The friction necessary for this purpose, however, is very low, thus minimizing the wear on the felt rings 8.

Figure 2:
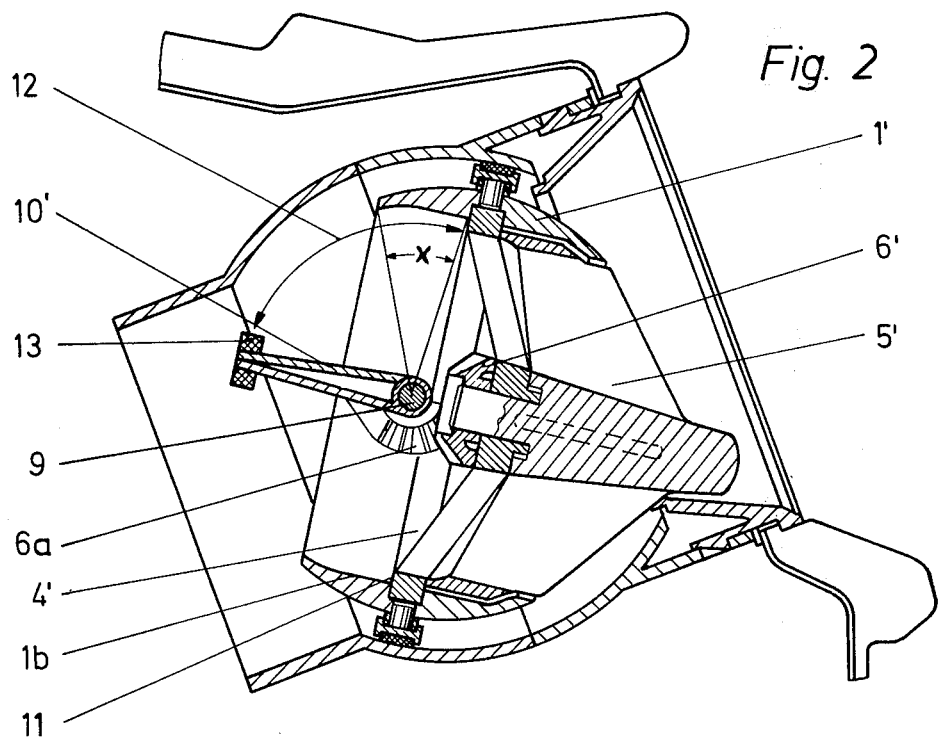
FIG. 2 shows in a similar cross section, a modified embodiment of the invention.

The alternative embodiment of FIG. 2 shows a similar adjustable air nozzle with a double-clappet valve 10' arranged on a pivot shaft 9. This pivot shaft 9 is likewise located near the center of the nozzle sphere and gimbal ring 7, but inwardly off-set therefrom by a small amount. The motion path of the clappets 10 between their fully open position, as shown, and their fully closed position is indicated by the double arrow 12. Radially outside this path, the inner wall 1b of the nozzle shell 1 is shown to form a progressively widening annular gap between the path of the clappet 10 and the shell surface 1b. The resulting throttling effect of the double-clappet valve is thus adjustable with great sensitivity, over an angular range indicated at $x$, which may be as much as 40°, and which could be further increased, if desired.

In the fully extended, i.e. closed position of the clappets 10', the latter engage a central abutment shoulder 11. This shoulder may be defined by the rim that surrounds the cross support 4', which is mounted in the separation plane of the nozzle shell halves. For an absolutely air-tight closing of the valve, the clappets may be provided with suitable rim gaskets 13 of felt, rubber, or the like. Alternatively, the cross support 4', against which they abut, may be adapted to include such a sealing element.

The double-clappet valve and its bevel gear drive are known from the prior art, particularly from U.S. Pat. No. 3,420,448. The driving gear 6 or 6', respectively, which is solidary with the wing knob 5 or 5', meshes with two bevel gear segments which are solidary with the hubs 10a of the valve clappets 10 (FIG. 3), pivoting the latter in opposite directions, when the wing knob 5 is rotated.

It should be understood, of course, that the foregoing disclosure describes only preferred embodiments of the invention and that it is intended to cover all changes and modifications of these examples of the invention which fall within the scope of the appended claims.

We claim the following:

1. An adjustable air outlet nozzle, especially suited for automobile heating and venting or air-conditioning systems, comprising in combination:

a generally tubular stationary connector housing having a length portion defining a lodgement with a spherical inner guide surface of enlarged diameter;

a generally tubular nozzle shell received inside the lodgement of the connector housing, the nozzle shell having an outer surface in the shape of a bilaterally truncated sphere which is concentrically spaced from the guide surface of the lodgement so as to define a radial gap therewith;

a double-clappet valve mounted inside the nozzle shell on a transverse pivot shaft arranged in the vicinity of the center of the above-mentioned spherical surfaces, said valve comprising two generally flat clappets attached to axially adjacent clappet hubs and a bevel gear solidary with each clappet; the valve clappets being pivotable between an open position in which they point generally upstream, to the inside of the nozzle, and a closed position in which they are spread apart so that their rims contact the nozzle shell;

a wing knob on the downstream, outer side of the nozzle shell rotatably received inside the latter in alignment with the shell axis, the wing knob having a drive bevel gear attached thereto and arranged to mesh with both of said clappet bevel gears; and a gimbal ring disposed in the radial gap between the housing lodgement and the nozzle shell, said gimbal ring including means for universally pivoting the nozzle shell in relation to the connector housing.

2. An air nozzle as defined in claim 1, wherein:

said universal pivoting means of the gimbal ring includes two pairs of radially inwardly and outwardly extending integral pivot pins in diametrally opposite locations and at 90°-angles between the pairs; and the housing lodgement and the nozzle shell have each a pair of cooperating radial pivot bores, at least one of the former being constituted by two originally separate halves, joined at a separation plane which extends through its pivot bores.

3. An air nozzle as defined in claim 2, wherein:

both the housing and the nozzle shell are constituted of originally separate halves, split along a radial plane that coincides with the center of their spherical surfaces and gimbal pivot bores;

the nozzle shell further includes a cross support with a peripheral rim which engages the inner wall of the nozzle shell in the area of its separation plane, being axially confined between the shell halves; and the cross support has a central axially aligned journal for the wing knob.

4. An air nozzle as defined in claim 3, wherein the pivot bores in at least one of the two parts engaged by the gimbal ring are constituted by bushings which are solidary with said part; and the matching halves of at least said part are permanently joined along their original separation plane by a weld which also attaches said bushings.

5. An air nozzle as defined in claim 4, wherein the connector housing and the nozzle shell are injection molded as matching halves and permanently joined together by means of an ultrasonic weld.

6. An air nozzle as defined in claim 1, wherein the gimbal ring has a cross-sectional profile of an axially oriented "I", thereby defining inner and outer shallow radial grooves between the flanges of said "I", the gimbal ring holding in each of said grooves a compressible seal ring engaging the spherical surfaces of the nozzle shell or housing lodgement, respectively.

7. An air nozzle as defined in claim 1, wherein:

the transverse pivot shaft of the double-clappet valve is spaced a distance from the inner axial extremity of the nozzle shell; and the nozzle shell defines a substantially flat, circular axial abutment shoulder, located at approximately the same distance from the inner end of the nozzle shell, for engagement by the valve clappets in their closed position.

8. An air nozzle as defined in claim 7, wherein the valve clappets and the cooperating abutment shoulder include between them a flexible gasket member attached to one of them, so as to serve as a seal therebetween in the closed valve position.

9. An air nozzle as defined in claim 7, wherein the nozzle shell includes a generally tubular length portion between its inner axial extremity and its abutment shoulder, said tubular length portion having an inner wall which is so contoured that an axially inwardly progressively widening radial gap is defined between the wall and the rims of the two clappets, as seen in a plane perpendicular to the clappet pivot axis.

10. An air nozzle as defined in claim 9, wherein the contoured inner wall length portion of the nozzle shell is of a length which corresponds to an angular path of the clappets of approximately 40°.

* * * * *